US006317247B1

(12) United States Patent
Yang et al.

(10) Patent No.: US 6,317,247 B1
(45) Date of Patent: Nov. 13, 2001

(54) BIAS VOLTAGE STABILIZING METHOD FOR ELECTRICITY-OPTICAL MODULATOR BASED ON OFF-LEVEL SAMPLING

(75) Inventors: Choong Reul Yang; Wol Yon Hwang; Hyun Hah Hong; Sun Gyu Han; Heuk Park, all of Taejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/204,218

(22) Filed: Dec. 2, 1998

(30) Foreign Application Priority Data

Aug. 31, 1998 (KR) .................................................. 98-35647

(51) Int. Cl.$^7$ ....................................................... G02F 1/07
(52) U.S. Cl. .......................... 359/245; 359/239; 359/181; 385/2
(58) Field of Search .................................... 359/237, 239, 359/245, 183, 187, 246, 329, 181; 385/2, 3, 9

(56) References Cited

U.S. PATENT DOCUMENTS

| 5,003,624 | 3/1991 | Terbrack et al. ...................... 455/618 |
| 5,400,417 | 3/1995 | Allie et al. .................................. 385/2 |
| 5,532,867 | 7/1996 | Hayes et al. ........................... 359/329 |
| 5,646,771 | * 7/1997 | Noda .................................... 359/245 |
| 5,907,426 | * 5/1999 | Kato et al. ............................. 359/239 |

OTHER PUBLICATIONS

Carolyn R. Mercer et al., "Fiber optic phase stepping system for interferometry", Applied Optics, Mar. 1, 1991 vol. 30, No. 7, pp. 729–734.

Q. Jiang et al., "A Subcarrier–Multiplexed Coherent FSK System Using a Mach–Zehnder Modulator with Automatic Bias Control", IEEE Photonics Technology Letters, vol. 5, No. 8, Aug. 1993, pp. 941–943.

"Novel Automatic Bias Voltage Control For Travelling–Wave Electrode Optical Modulators", Electronics Letters May 23, 1991, vol. 27, No. 11, pp 943–945.

* cited by examiner

Primary Examiner—Loha Ben
(74) Attorney, Agent, or Firm—Cohen, Pontani, Lieberman & Pavane

(57) ABSTRACT

A bias voltage stabilizing method for an electricity-optical modulator based on an off-level sampling is disclosed. The method includes the steps of a first step for detecting an electric signal by feed-back an output optical signal of a MZ optical modulator, performing a sample and hold for an OFF level and converting the signal into a digital data, a second step for receiving the sample and hold data with respect to the OFF level, controlling a bias value by performing an up and down count so that a minimum operation level is maintained at near a zero level of an output optical signal based on a binary data and a current data value, and adjusting a bias value, and a third step for outputting a bias control voltage of an optical modulator by converting the bias value controlled by the up and down count into an analog signal, for thereby controlling an adaptive bias voltage irrespective of a traffic characteristic of a signal by selectively extracting an OFF level of an output light, measuring the thusly extracted level and minimizing the value for thereby controlling a bias voltage.

5 Claims, 7 Drawing Sheets

BIAS VOLTAGE STABILIZING METHOD FOR ELECTRICITY-OPTICAL MODULATOR BASED ON OFF-LEVEL SAMPLING

BACKGROUND OF THE INVENTION

1. Field of the Invention

The present invention relates to a bias voltage stabilizing method for an electricity-optical modulator based on an off-level sampling, and in particular to an improved bias voltage stabilizing method for an electricity-optical modulator based on an OFF-level sampling which is capable of stabilizing an output characteristic of a Mach-Zehnder (MZ) interference type optical modulator formed of a $LiNbO_3$ or electrical-optical polymer.

2. Description of the Conventional Art

Generally, the operation level of an electricity-optical modulator is different in accordance with an application system. For this, a DC voltage may be applied to a signal electrode or an additional bias voltage electrode may be provided for controlling an operation level of a modulator. However, a conventional electricity-optical modulator has a DC drift phenomenon with respect to the DC power. In addition, the operation level may be changed due to a surrounding temperature and moisture, stress, etc. This operation level variation may result in a distortion of a high speed modulated optical signal and a degradation of an extinction ratio.

FIGS. 1A and 1B illustrate an output type based on an initial operation level of an optical modulator when the identical digital signals are inputted. As shown in FIG. 1A, a digital signal is inputted as indicated by "1" and is converted into an optical signal by the optical modulator having a modulator output characteristic as indicated by "2", and is outputted as indicated by "3". At this time, the initial bias voltage level "a" which is the initial level of an output characteristic curve of a modulator is coincided with the bias voltage level of an electrical signal. In addition, in this case, it means that the electrical signal is well converted into an optical signal.

However, as shown in FIG. 1B, the operation level which is the minimum level of a modulator output characteristic curve is shifted from the initial bias voltage level. Therefore, when the same is shifted to the level position of the electrical signal "1", the optical signal as indicated by "3" is distorted, so that it is impossible to identify a high bit or low bit. When the same is shifted away from the initial bias voltage level, the output signal level of the converted optical signal may be changed.

Therefore, it is needed to control the operation level. For this, an additional bias voltage is installed at the optical modulator for thereby controlling the operation level. However, an initial optical modulator operation level determined based on a DC bias voltage applied to an optical wave guide layer may be changed due to a photo refractive effect of a medium, a DC drifting phenomenon based on an accumulation of a space charge, a surrounding temperature variation, etc.

In order to continuously maintain an initial state of an operation level, the bias voltage is changed in accordance with an output state of an optical modulator, an output light stabilizing method is needed.

One of the most used methods is a stabilizing method using a dithering signal as shown in FIG. 2.

As shown in FIG. 2, a second harmonic signal is extracted from a dithering signal 1 using a band pass filter 2, a frequency doubler 3, and a phase controller 4. An optical signal from the optical modulator 5 is detected by a photo detector 6 and passes through a low noise amplifier 7. The optical signal outputted from the low noise amplifier 7 is controlled by a lock-in amplifier 8 in accordance with a second harmonic signal of the dithering signal outputted from the phase controller 4. The output signal from the lock-in amplifier 8 is inputted into an adder 12 through a low band pass filter 9 and an integrator 10. A fundamental wave signal of the dithering signal 1 passes through the band pass filter 2 and a DC bias voltage signal inputted from the DC bias voltage unit 11 are added with the signal from the integrator 10 by the adder 12 for thereby controlling the optical modulator 5.

A fundamental wave of a dithering signal modulated by applying a 1~100 kHz small electrical envelop dithering signal to the input light or a second harmonic signal is extracted for thereby obtaining an error signal, and then the bias voltage is controlled based on a feed-back control using the thusly obtained signal.

If the second harmonic signal of the dithering signal is extracted, and an error signal is used, the error signal value becomes 0(zero) at the level in which the linearity is best, and at this level, the code of the level of the error signal is changed. Therefore, it is possible to stabilize the position of the operation level of the optical modulator 5 at the level in which the linearity is best by controlling the DC bias voltage 11, namely, a reference voltage inputted into the adder 12 in accordance with the level of the output signal of the lock-in amplifier 8.

However, when forming the feed-back circuit using a fundamental wave of a dithering signal of the optical modulator or a second harmonic wave as an error signal, the values of the error signal to be checked in accordance with the traffic character is changed. Therefore, the lock-in detection method based on the known dithering signal is not proper for the optical gate application of the optical modulator.

FIG. 3 illustrates a circuit for controlling the bias voltage for providing the identical traffic characteristic compared to a valid DC component of an electrical input signal and an optical output signal based on the conventional method.

An input signal is inputted into an optical modulation driver 24 as a modulation signal 23, and an optical modulator 22 receives a source light of a laser diode 21 and changes a modulation signal 23 into an optical signal in accordance with a driving of an optical modulation driver 24. At this time, the signal passed through the low pass filter (LPF) 25 and the reference voltage 27 are differentially amplified by a first differential amplifier 26 with respect to the modulation signal 23, and an optical signal outputted from the optical modulator 22 is detected by the photo detector (PD) 29 and passes through the low pass filter 30 and then an optical signal is detected based on a pre-amplifier 31, and an output signal from the pre-amplifier 31 and an output signal from the first differential amplifier 26 are differentially amplified by a second differential amplifier 32 and then the thusly amplified signal is inputted into a PI (Proportional Integrated) control circuit 33, so that the PI control circuit 33 controls the output characteristic of the optical modulator 22.

The modulation signal 23 which is an electrical signal inputted into the optical modulator 22 is filtered using a low band pass filter 25 for thereby obtaining a reference voltage proportional to the amount of the traffic of the signal. In addition, an optical output from the optical modulator 22 is measured and then is filtered using the low pass filter(LPF) 30 for thereby obtaining a DC voltage proportional to the traffic signal of the output light. If the output signal from the optical modulator 22 is modulated identically to the electrical signal, the DC voltage (namely, the output voltage of the pre-amplifier 31) of the output of the optical modulator 22 and the value of the electrical reference voltage (namely, the output voltage of the first differential amplifier 26) should be identical. Therefore, the voltage difference between the reference voltage of the electrical signal and the optical output is obtained by the second differential amplifier 32, so that the optical modulator 22 is modulated based on the DC control circuit 33 in accordance with the error signal. Therefore, it is possible to obtain an optical output modulated identically to the electrical signal inputted.

The above-described method may be adapted to the burst traffic characteristic, but uses an error signal proportional to the absolute value of the DC voltage. Therefore, the circuit may be affected by an unstable operation of the electronic circuit devices due to a temperature, humidity and stresses etc. As a result, the above-described method is not adapted to the burst optical gate application of the optical modulator.

In the modulation of an analog signal and a digital signal transmission, since a signal distortion problem may occur due to the periodic output characteristic of the optical modulator, an operation level at which the output characteristic curve of the optical modulator is best is fixed. In this case, a small dithering signal may be carried on the bias voltage electrode or a signal is modulated into a small dithering signal of a low frequency. Therefore, the level in which the second harmonic wave of the optical signal modulated by the dithering signal is the level in which the linearity is best. Namely, the level corresponds to the level in which the phase difference is Π/2. Therefore, the above-described method is generally used.

However, in the case that the electricity-optical modulator is used as an optical gate, it is important to maintain a maximum extinction state of the ON/OFF state of the output light. Namely, the OFF state should be in a minimum pass-through state of the optical modulator.

Therefore, for using an application of the optical gate, in the case that an electrical input signal is OFF, the bias voltage of the modulator is controlled to be at the minimum level of the output of the modulator. For this, if the dithering signal method is used, since the fundamental frequency component is the lowest at the minimum level of the pass-through curve, it is possible to control the bias voltage based on the method of minimizing the fundamental dithering frequency component of the output light.

However, in this case, it is assumed that the traffic characteristic of the input signal is a uniformly scrambled data or is constantly defined. If the input signal has a burst characteristic like the input signal is continuously ON or OFF, the size of the error signal for the output stabilization may differ in accordance with the traffic characteristic, so that it is impossible to implement an adaptive control of the optical modulator.

The problems that in the conventional dithering method, it is difficult to implement an adaptive control in accordance with the traffic characteristic are caused for the reason that the error signal is extracted in the ON and OFF states of the output light.

SUMMARY OF THE INVENTION

Accordingly, it is an object of the present invention to provide a bias voltage stabilization method for an electricity-optical modulator based on an off-level sampling which overcomes the aforementioned problems encountered in the conventional art.

It is another object of the present invention to provide a bias voltage stabilization method for an electricity-optical modulator based on an off-level sampling which is capable of controlling an adaptive bias voltage irrespective of a traffic characteristic of a signal by selectively extracting an OFF level of an output light, measuring the thusly extracted level and minimizing the value for thereby controlling a bias voltage.

In the present invention, an OFF level of an output light signal is selectively measured by a sample and hold method, and an initial operation level is determined by assuming the thusly measured value as a minimum operation level for thereby maintaining the level, so that the maximum extinction ratio of the output light is implemented.

In addition, in the present invention, a minimum operation level of the output light signal is selectively selected using a sample and hold method, and a bias voltage is controlled by up and down counting for minimizing the extracted value, so that it is possible to automatically stabilize a bias voltage of an electricity-optical modulator without an influence of the various traffic characteristics in the burst mode.

In the present invention, a data of an OFF level of the sample and hold is received, and the value of a previously inputted signal level and the current value is compared for thereby judging a slope of the output characteristic curve of the optical modulator based on a result of the comparison. In the rising curve interval of the curve, if the current value is larger than the previous value, the down count is implemented, and otherwise, the up count is implemented. In the falling curve interval of the curve, if the current value is larger than the previous value, the up count is implemented, otherwise, the down count is implemented. The up/down counted bias values are outputted for thereby searching the minimum level of the output light signal. Therefore, the minimum level of the operation is implemented at around the zero level. At the zero level, if the operation level is increased by a predetermined operation, the level is controlled to decrease, and if the level is decreased, the level is controlled to increase. Therefore, the above-described operation is continuously performed for thereby maintaining a uniform value.

Therefore, in the conventional lock-in detection method using a dithering signal has a problem in that the traffic characteristic of the input signal does not operate at the burst traffic which changes in accordance with the time lapse. However, in the present invention, the method based on an OFF level sampling of the output light is implemented in the burst mode with respect to the traffic characteristic of the optical signal for thereby maintaining a maximum extinction ratio and compensating for a degradation of the average output capacity.

The present invention may be applicable to an optical packet switch based on WDM (Wavelength Division Multiplexing) using an electricity-optical modulator, a high speed 100 Gb/S class optical signal link, a high speed light source used for a high speed multiwavelength conversion, and an optical buffer.

In order to achieve the above objects, there is provided a bias voltage stabilization method for an electricity-optical modulator based on an off-level sampling which includes the steps of a first step for detecting an electric signal by feed-back an output optical signal of a MZ optical modulator, performing a sample and hold for an OFF level and converting the signal into a digital data, a second step for receiving the sample and hold data with respect to the OFF level, controlling a bias value by performing an up and down count so that a minimum operation level is maintained at near a zero level of an output optical signal and a current data value, and adjusting a bias value, and a third step for outputting a bias control voltage of an optical modulator by converting the bias value controlled by the up and down count into an analog signal.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly leveled out in the appended claims as a result of the experiment compared to the conventional arts.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1A:
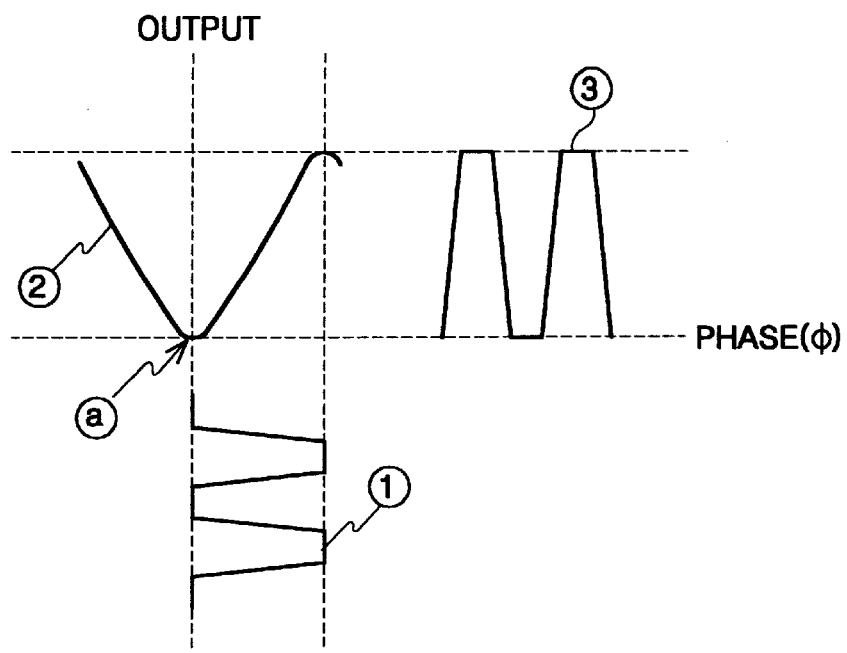
FIGS. 1A and 1B are shows illustrating an output signal type from am optical modulator based on an initial bias voltage operation level with respect to an identical electrical signal input.
Figure 1B:
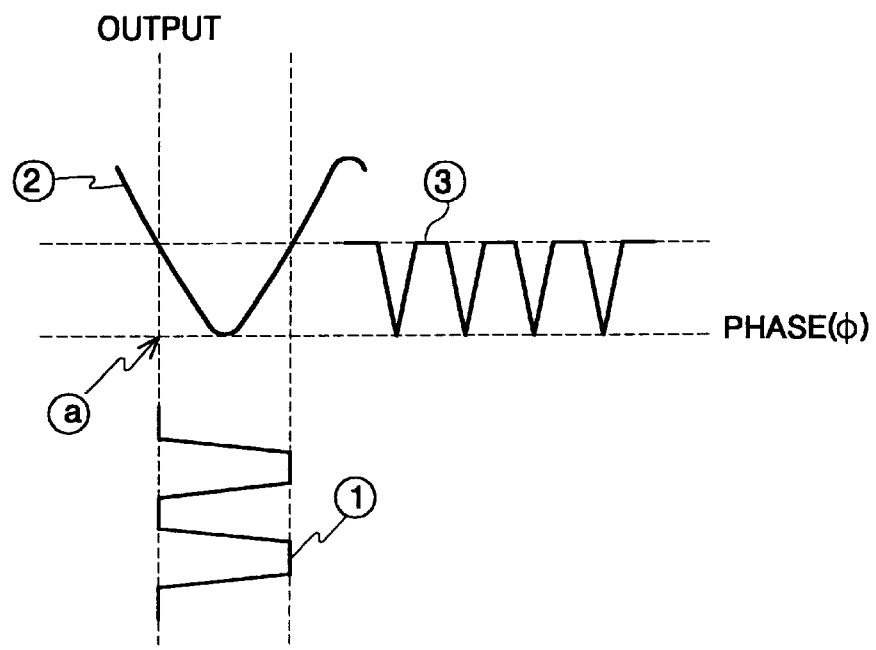
Figure 2:
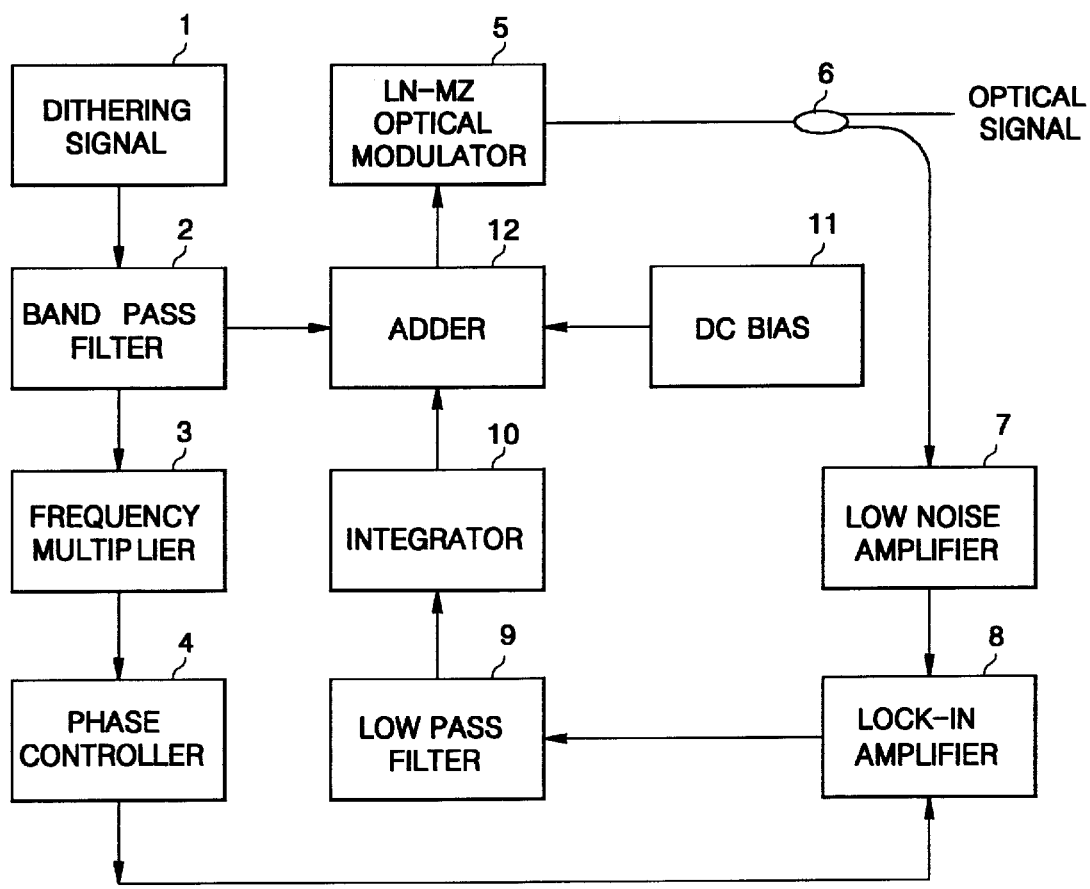
FIG. 2 is a block diagram illustrating the construction of a stabilization circuit employing for an optical modulator based on a conventional dithering method and a stabilization circuit for controlling a bias voltage using a lock-in detection amplifier.
Figure 3:
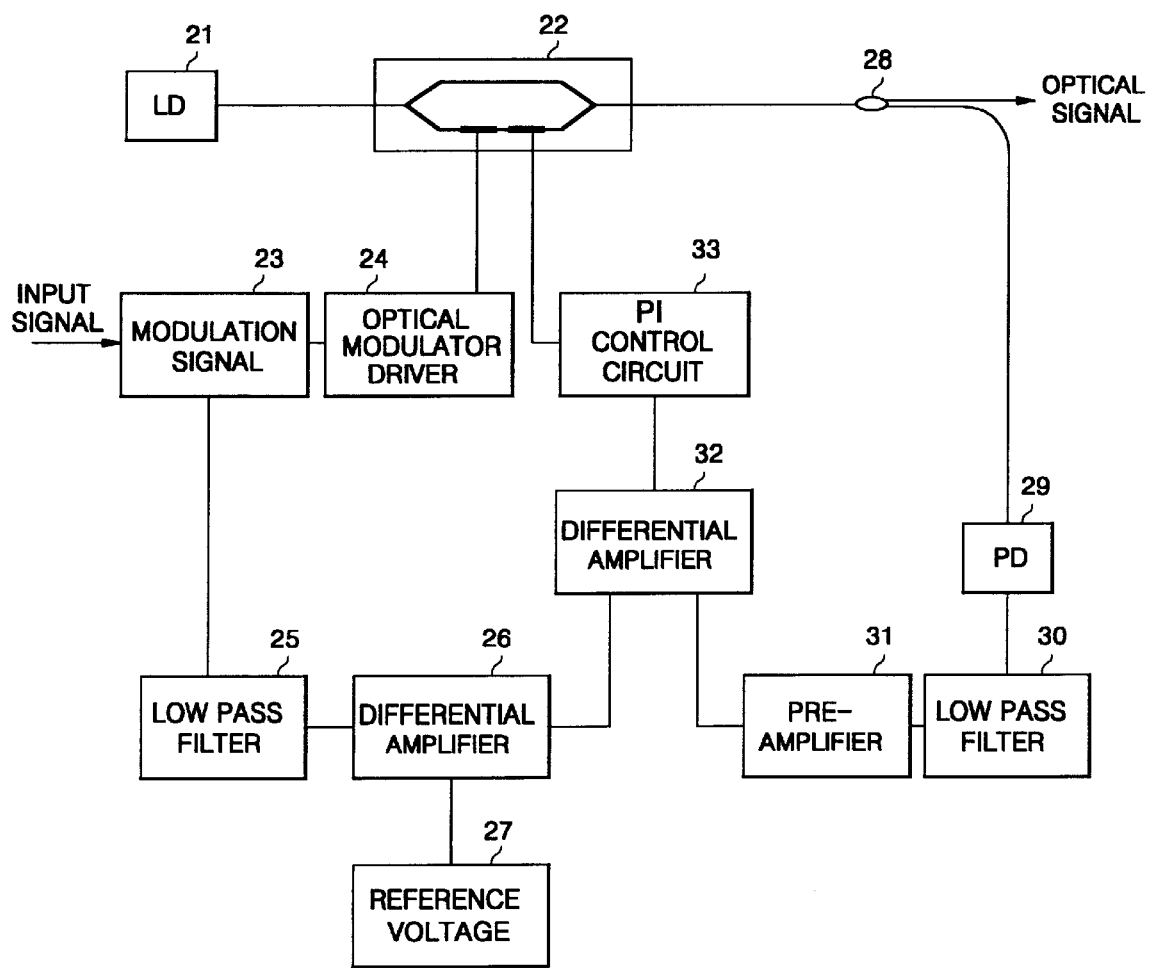
FIG. 3 is a block diagram illustrating a stabilization circuit controlling an optical modulator bias voltage compared to a traffic signal of an electric input signal and an optical output signal.
Figure 4:
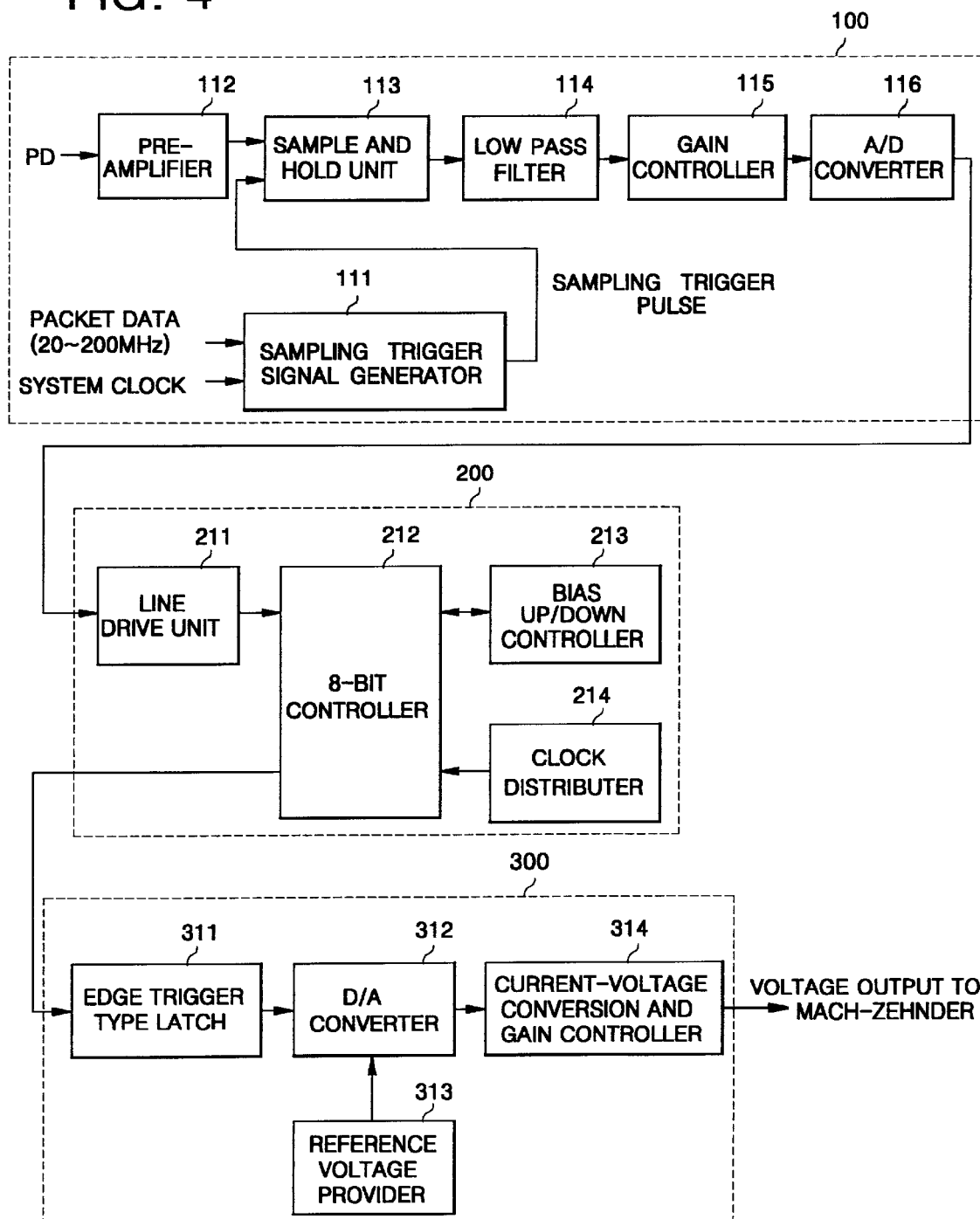
FIG. 4 is a block diagram illustrating a bias voltage stabilization method for an optical modulator based on a sample and hold method according to the present invention.

FIG. 4 illustrates a bias voltage stabilizing circuit for an optical modulator based on a sample and hold method according to the present invention.

As shown therein, the circuit includes an output light ON/OFF detector 100 for generating a sampling trigger signal (/DATA & CLK) capable of reading a minimum level, namely, an OFF state of an output light based on an AND logic operation with a system clock signal after obtaining an inverted data /DATA from an electrical input data DATA and sampling the OFF level of the signal using the sample trigger signal based on a low level sampling method, an adaptive bias controller 200 for receiving a sample and hold data based on the detection of an ON/OFF level of an output light of the output light ON/OFF detector 100, comparing the current input value with the previously inputted data after providing the same with a predetermined value, controlling the bias value in the down direction if the current value is larger than the previous value in the up interval of the output light signal and in the up direction if the current value is larger than the previous value in the down interval and maintaining an operation minimum level at around zero of the output light signal, and a bias control voltage output unit 300 for converting the bias value from the adaptive bias voltage controller 200 into an analog signal and outputting the same as an initial bias control voltage of the optical modulator.

The output light ON/OFF detector 100 includes a sampling trigger signal generator 111 generating a sampling trigger signal /DATA&CLK, a sample and hold unit 113 for performing a sample and hold operation with respect to an optical detection signal based on the sampling trigger output signal, a low pass filter 114 for filtering the sample and hold signal, a gain controller 115 for reasonably amplifying the gain, and an A/D converter 116 for converting the signal into a digital signal and outputting the same to the adaptive bias controller 200.

The adaptive bias controller 200 includes a line driver 211 for receiving an A/D-converted digital signal and controlling a write and read operation, a controller 212 for receiving a digital data through the line driver 211, comparing the previous input with the current input, controlling the up/down count operation of the bias voltage value, and outputting an adaptive controlled bias value, a bias voltage up/down controller 213 for increasing and decreasing the bias voltage in accordance with an up/down control of the controller 212, and a clock signal provider 214 for providing a clocks signal.

The bias control voltage output unit 300 includes an edge trigger type latch 311 for latching an up/down data from a 8-bit controller 212 and outputting a latched binary data, a digital/analog converter 312 for converting the digital signal from the edge trigger latch 311 into an analog signal and generating a bias voltage matching with the count value, a reference voltage adjusting unit 313 for outputting a reference voltage of the digital/analog converter 312, and a current-voltage conversion and gain controller 314 for converting the bias current value, which is converted into the digital signal, into a voltage output value and controlling the bias input voltage value supplied to the optical modulator.

The bias voltage stabilizing method of the electricity-optical modulator according to the present invention will be explained with reference to the accompanying drawings.

Figure 5:
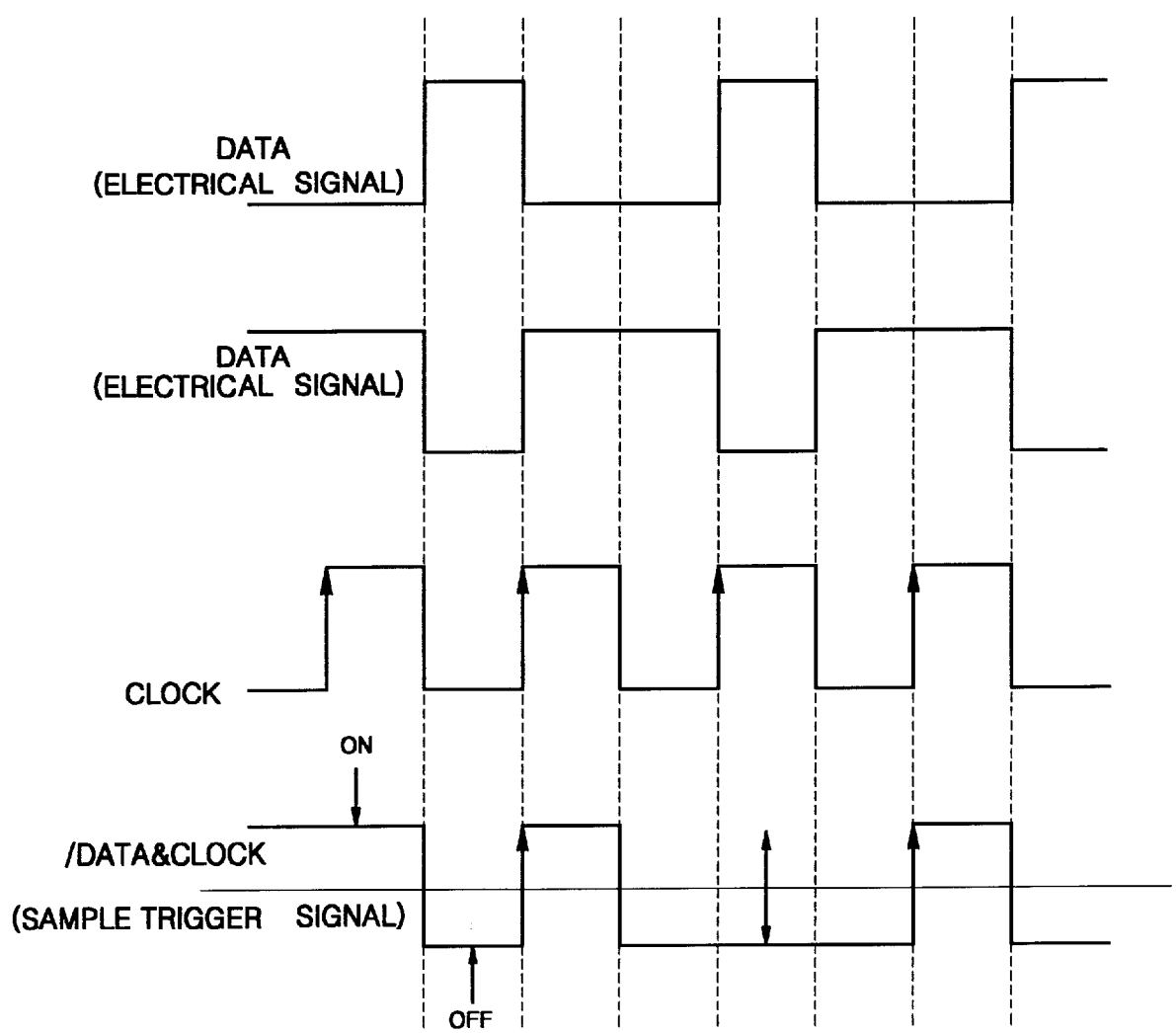
FIG. 5 is a wave-form diagram illustrating a method of generation of sampling trigger signal for maintaining a minimum bias voltage level of an optical modulator as an operation level by sampling the intensity of an output light when an electrical input signal is OFF.

FIG. 5 illustrates a timing diagram for generating a sampling trigger signal used for selectively detecting an OFF level signal of an output light based on a sample and hold method according to the present invention.

The sampling trigger signal generator 111 generates a sampling trigger signal for maintaining a minimum operation bias level of the optical modulator. For this, as shown in FIG. 5, the packet data of 20 MHz~200 MHz (indicated by DATA in FIG. 5 as a source data for generating the optical signal) is received as an input data and then is inverted for thereby obtaining the data /DATA. The inverted data and the system clock signal CLK are ANDed for thereby generating an ECL(Emitter coupled logic) sampling trigger signal /DATA&CLK for reading the OFF state of the output light. The OFF level of the output light signal is detected from a rising edge using the sampling trigger signal. The OFF level is processed based on a sample and hold method for thereby converting into the digital data.

The pre-amplifier 112 amplifies the small current (10 mA) inputted from the photo detector(PD) to a predetermined level.

The sample and hold unit 113 performs an analog memory function for memorizing the minimum level of the final input signal in a predetermined time interval. The signal is triggered at a rising edge of the sampling trigger signal with respect to the output light signal of the photo detector(PD) of 20 MHz~200 MHz amplified to 20 dB for thereby detecting the minimum level of the output light data. The signal voltage level is continuously stored into the capacitor of the sample and hold unit 113. The sample and hold unit 113 uses a device AD9100 capable of implementing a tracking band up to the maximum rate 250 MHz.

Therefore, the sample and hold unit 113 processes an output signal from the pre-amplifier 112 based on the sample and hold method in accordance with a sampling trigger signal from the sampling trigger signal generator 111.

The low pass filter 114 (LPF) receives a high speed sample and hold output signal in a beat signal type similar to the DC for thereby removing the ripple component.

The output signal passes through the LPF, and the gain of the same is amplified to a predetermined level by the amplifier which operates in the non-inversion mode.

The A/D converter 116 outputs a 1-bit value in which the sequence is determined at one clock time in the sequence that the clock signals are generated at the rising edge. The data is outputted after a delay time of the control at the rising edge of the next clock signal based on the encoder and latch functions. When the clock signal is stopped during the A/D conversion, the input value at the time of the stop is maintained by the counter and DA conversion, and the final data is memorized as long as the electric power is supplied.

The line driver unit 211 is read-enabled when the A/D converted digital signal is applied to the controller 212 and is write-enabled when the signal is transferred from the 8-bit controller 212 to the D/A converter 312.

The 8-bit controller 212 reads an A/D converted digital output data by the internal software at the initial stage and stores the same as an initial bias value, and then reads the current signal level and stores into the internal register and compares the previously inputted data $T_A$ and the currently inputted input signal $T_B$.

It is also available to more easily perform the Sample & Hold an unity controller including line drive and A/D converter in it.

Generally, the electricity-optical modulator has a periodic characteristic with respect to the up and down operation of the bias voltage. Therefore, in order to minimize the OFF level, the variations of the output value of the OFF level and the bias voltage for minimizing the output value should be checked. In order to check the above-described variations, the slope with respect to the bias voltage is checked from the current output value. The slope is continuously checked by providing a predetermined value.

Figure 6:
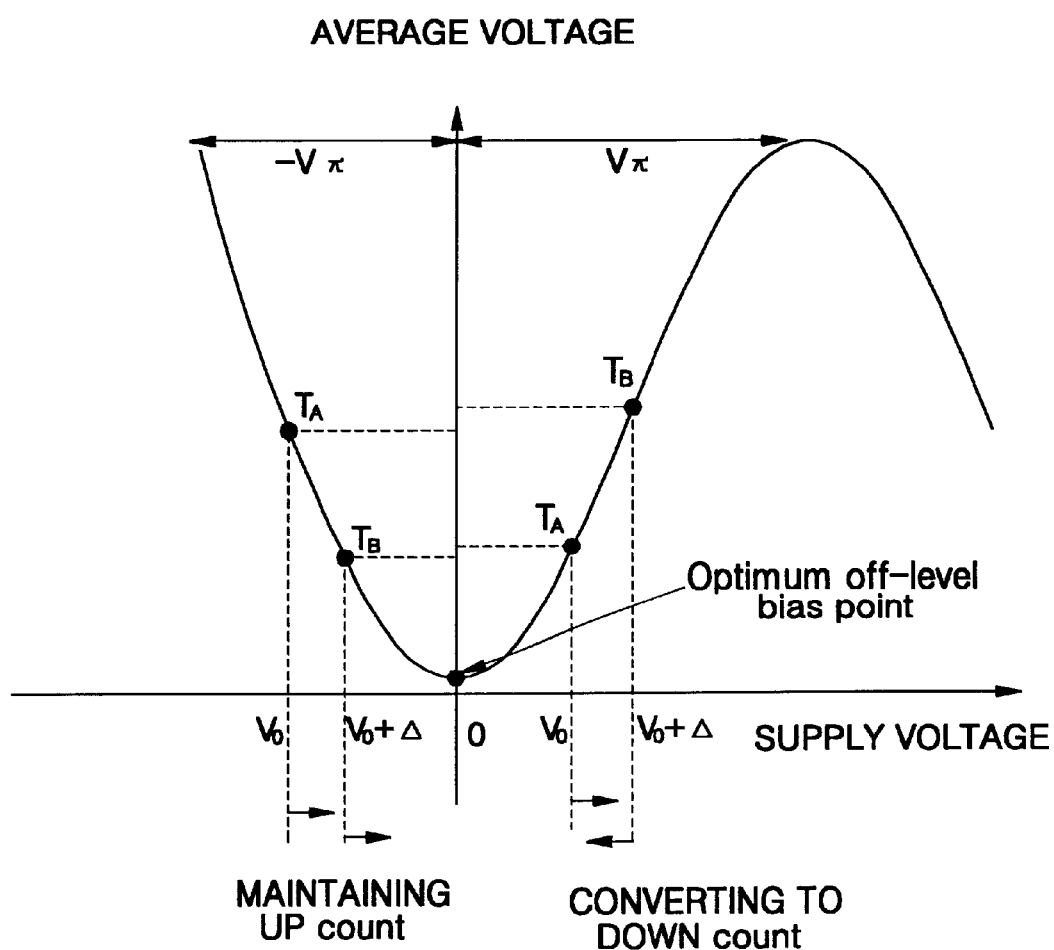
FIG. 6 is a show explaining a principle for maintaining a minimum operation level of a signal based on a sample and hold method according to the present invention.
Figure 7:
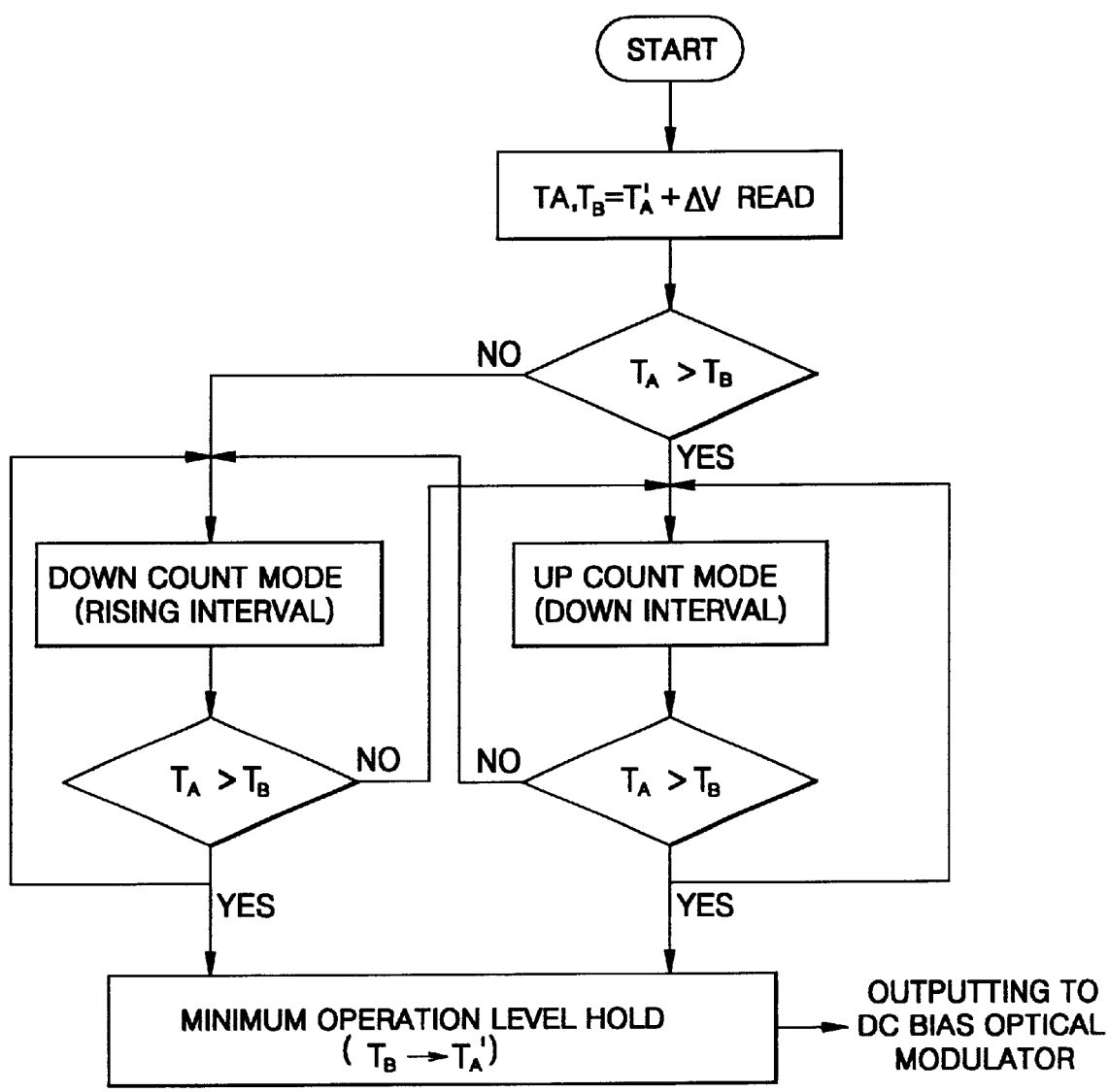
FIG. 7 is a flow chart illustrating an algorithm for maintaining a minimum level bias voltage of an output light gate signal inputted into an optical modulator according to the present invention.

FIG. 6 illustrates a bias voltage control characteristic and FIG. 7 illustrates a flow chart for controlling an adaptive bias voltage according to the present invention.

The above-described variation can be checked by checking the slope with respect to the bias voltage of the modulator passing-through curve from the current output value by continuosly applying a predetermined small value to the output optical signal. Namely, the method for receiving the data is determined as a current input value by averaging the input data for a predetermined number (for example, eight times).

The initial input value $T_A$ is stored and outputted as a bias value, and the current input value $T_A$ and the value ($T_B=T_{A'}+\Delta V$) that a predetermined value ($+\Delta V$) (for example, the supply voltage of the device X 8-bit=12×1/256=50 mV) is added to the bias voltage $T_A$, are compared.

As shown in FIG. 6, assuming that the output value at the current voltage $V_b=V_o$ is $T_A$, the value of $+\Delta V$ (up count) is applied to the bias voltage, and assuming that the output value at $V_b=V_o+\Delta V$ is $T_B$, in the case of $T_A>T_B$, since the OFF level is in the $-V_n$ interval, the up count is continuously maintained.

In the case of $T_A<T_B$, since the OFF level is the interval of $+V_n$, the feed back bias voltage is changed to the down count direction. If the output value is decreased with respect to the $+\Delta V$, the direction of the predetermined value is maintained identically to the previous operation, and on the contrary, the output value is increased, the direction is changed. Therefore, the minimum level of the output light signal is maintained at the operation level for thereby minimizing the same. At the zero point, the predetermined operation is randomly applied. If the operation level is increased, the same is controlled to decrease, and if the operation level is decreased, the same is controlled to increase for thereby uniformly maintaining the above-described value.

The controller 200 is implemented by a small bit size processor (AT89C2051) for performing an algorithm for checking the minimum level of the output light signal.

As shown in FIG. 7, the value $\Delta$ which is the up/down basic step value is added to the currently inputted data $T_A$ and the bias value $T_{A'}$ ($T_B=T_{A'}+\Delta V$), and then the values of $T_A$ and $T_B$ are compared. As a result of the comparison, if the value $T_A$ is larger than $T_B$, the up count mode is operated, and as the up count mode is performed, when the value $T_A$ is not larger than the value $T_B$, the mode is quickly changed to the down count mode, and then the down count mode is performed. In addition, the state that the value $T_A$ is larger than $T_B$ before the next data is inputted, the up count is performed by the predetermined value for thereby outputting a bias control value.

As a result of the comparison, if the value $T_A$ is not larger than the value $T_B$, the mode is quickly changed to the up count mode. The state that the value $T_A$ is larger than the value $T_B$ is maintained until the next data is inputted, and the up count is performed by the predetermined value for thereby outputting a bias control value.

The rising edge triggering latch 311 latches the up/down data from the 8-bit controller 212 and outputs a digital data to the D/A converter 312 at the rising edge of the next clock from the 8-bit controller 212.

The D/A converter 312 receives a minimized digital signal from the controller and converts the digital signal into an analog signal for thereby providing a stable DC bias to the optical modulator. The voltage value for controlling the bit per resolution capacity is provided through the reference voltage providing unit 313.

The current-voltage conversion and gain controller 314 converts the current output value of the D/A converter 312 as a voltage output value under the load condition based on the inversion amplifier by the OP amplifier and controls the gain to a predetermined amplitude.

Then, the signal obtained by the D/A converter is directly supplied to the EO modulator.

As described above, in the present invention, it is possible to stably maintain a high extinction ratio without any effects from the burst traffic characteristic of the optical signal using the OFF-level optical signal sampling and its minimizing process. In addition, the system may operate even for the burst traffic pattern in which the input traffic characteristic is continuously changed between ON and OFF by detecting the OFF-level (operation minimum level) of the output light signal and continuously maintaining the same as an operation level. Furthermore, it is possible to compensate the degradation of the optical output by minimizing the OFF level of the detected output optical signal, maximizing the extinction ratio, and automatically maintaining the minimized level.

In addition, the present invention may be effectively used for the optical gate using the electricity-optical modulator, a high speed variable wavelength optical source used for the high speed multiple wavelength conversion, and an optical signal link of 100 Gb/s in which the packet repetition is about 200 Mb/s.

Generally, the time required for the bias stabilization capable of maximizing the extinction ratio of the output light based on the feedback of the optical modulator output light signal is a few sec units. In the present invention, it is possible to control the same up to m sec in accordance with the characteristic of the system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A bias voltage stabilizing method for an electricity-optical modulator based on an OFF level sampling, comprising the steps of:
    (a) detecting an output optical signal outputted from a Mach-Zehnder (MZ) optical modulator as an electric signal, and performing a sample and hold on the electric signal for an OFF level so as to convert the electric signal into digital data as sample and hold data;
    (b) receiving the sample and hold data with respect to the OFF level, and adjusting a bias voltage value by performing an up and down count so that a minimum operation level is maintained at near a zero level of said output optical signal based on previous data and current data; and
    (c) converting the bias voltage value controlled by the up and down count into an analog signal, and outputting the analog signal as a bias control voltage for an optical modulator.

2. The method of claim 1, wherein said step (a) includes the steps of:
    (a-1) obtaining inverted data(/DATA) of electrical data (DATA) which are source data of the output optical signal, and generating a sampling trigger signal(/DATA&CLK) for a sample and hold with respect to the OFF level of the output optical signal based on an AND logic operation with a system clock signal;
    (a-2) receiving the output optical signal of the optical modulator through the optical detector, and detecting the output optical signal as an electrical signal;
    (a-3) performing a sample and hold with respect to the OFF level of the electrical signal using the sampling trigger signal; and
    (a-4) converting the sample and hold value into a digital data.

3. The method of claim 1, wherein said step (b) includes the steps of:
    (b-1) receiving a current value of sample and hold data and judging a slope of an output characteristic curve of the optical modulator based on a comparison between a previous value of sample and hold data and the current value;
    (b-2) performing a down count when the current value is larger than the previous value in the rising interval of the curve;
    (b-3) performing an up count when the current value is not larger than the previous value in the rising interval of the curve;
    (b-4) performing an up count when the current value is larger than the previous value in the falling interval of the curve;
    (b-5) performing a down count when the current value is not larger than the previous value in the falling interval of the curve; and
    (b-6) maintaining a minimum operation level at near zero level of the output optical signal by outputting the up/down counted bias voltage value.

4. The method of claim 1, wherein said step (b) includes the steps of:
    (b-1) adding a predetermined value (+ΔV)which is a basic step input voltage of an up and down count to an output value ($T_A$) at the current bias voltage, and obtaining $T_B = T_A + \Delta V$;
    (b-2) comparing the currently inputted value $T_A$ with the value $T_B$;
    (b-3) performing an up count mode when the value $T_A$ is larger than $T_B$ as a result of the comparison of the step (b-2);
    (b-4) performing a down count mode when the value $T_A$ is not larger than $T_B$ as a result of the comparison of the step (b-2);
    (b-5) performing the down count mode of the step (b-4) when the value $T_A$ is not larger than the value $T_B$ as a result of performing the up count mode of the step (b-3);
    (b-6) performing the up count mode of the step (b-3) when the value $T_A$ is larger than the value $T_B$ as a result of performing the down count mode of the step (b-4); and
    (b-7) holding and outputting the bias voltage controlled by the up and down count.

5. The method of claim 1, wherein in said step (b), the OFF level data of the output optical signal are received at predetermined times and the average value of the received OFF level data is determined as a current input value.

* * * * *